(12) United States Patent
Fleischhacker

(10) Patent No.: US 11,377,037 B2
(45) Date of Patent: Jul. 5, 2022

(54) ACCESS FLAP FOR A LUGGAGE COMPARTMENT OF A VEHICLE

(71) Applicant: Dr. Ing. h.c. F. Porsche Aktiengesellschaft, Stuttgart (DE)

(72) Inventor: Robert Fleischhacker, Tiefenbronn-Muehlhausen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 394 days.

(21) Appl. No.: 16/027,282

(22) Filed: Jul. 4, 2018

(65) Prior Publication Data

US 2019/0009726 A1 Jan. 10, 2019

(30) Foreign Application Priority Data

Jul. 7, 2017 (DE) .................. 10 2017 115 278.4

(51) Int. Cl.
*B60R 5/04* (2006.01)

(52) U.S. Cl.
CPC .............. *B60R 5/044* (2013.01); *B60R 5/045* (2013.01)

(58) Field of Classification Search
CPC ... B60R 9/06; B60R 2011/0036; B60R 5/044; B60R 5/045
See application file for complete search history.

(56) References Cited

U.S. PATENT DOCUMENTS

| 1,333,246 A * | 3/1920 | Colburn | B60R 7/046 |
| | | | 296/37.13 |
| 2,798,445 A * | 7/1957 | German | B60R 7/087 |
| | | | 109/50 |
| 3,010,760 A * | 11/1961 | Trautmann | B60J 5/101 |
| | | | 296/57.1 |
| 3,081,126 A * | 3/1963 | Theberge | B60R 7/12 |
| | | | 296/37.1 |
| 3,291,520 A * | 12/1966 | Smith | B60J 5/103 |
| | | | 296/24.44 |
| 4,222,600 A * | 9/1980 | Cripps | B60R 5/045 |
| | | | 296/37.1 |
| 4,443,034 A * | 4/1984 | Beggs | B60R 5/04 |
| | | | 296/65.17 |

(Continued)

FOREIGN PATENT DOCUMENTS

| AT | 009754 U1 | 3/2008 |
| DE | 60022412 T2 | 6/2006 |
| JP | 2009149131 A | 7/2009 |

OTHER PUBLICATIONS

German Search Report dated Jan. 31, 2019, for German Patent Application No. 10 2017 115 278.4.

*Primary Examiner* — Daniel P Cahn
*Assistant Examiner* — Abe Massad
(74) *Attorney, Agent, or Firm* — Leydig, Voit & Mayer, Ltd.

(57) ABSTRACT

An access flap for a luggage compartment of a vehicle includes a basic body configured to close an access opening to the luggage compartment of the vehicle in a closure position and to open up the access opening in an opening up position, and a bearing device configured to mount the basic body for a reversible movement between the closure position and the opening up position. The basic body has a fastening portion for the fastening of a covering device for covering the luggage compartment in the interior of the vehicle.

17 Claims, 2 Drawing Sheets

(56) References Cited

U.S. PATENT DOCUMENTS

| | | | | |
|---|---|---|---|---|
| 5,066,079 | A | * | 11/1991 | Lawrence ................ E05G 1/00 312/204 |
| 5,702,144 | A | * | 12/1997 | Matsuura ................ B60R 7/046 224/311 |
| 5,743,589 | A | * | 4/1998 | Felker ................ B62D 33/0273 296/180.5 |
| 5,967,054 | A | * | 10/1999 | Rosenfeld ................ B60R 5/045 108/115 |
| 6,227,594 | B1 | * | 5/2001 | Pommeret ................ B60J 5/101 296/37.1 |
| 6,375,055 | B1 | * | 4/2002 | Spykerman ............. B60R 5/045 108/12 |
| 6,464,276 | B1 | * | 10/2002 | Gruich ................ B60R 9/00 224/402 |
| 6,471,279 | B2 | | 10/2002 | Pommeret |
| 7,000,968 | B2 | * | 2/2006 | Welch ................ B60J 5/101 296/66 |
| 7,261,357 | B1 | * | 8/2007 | Bechen ................ B60R 3/02 296/57.1 |
| 7,628,439 | B1 | | 12/2009 | Strong |
| 7,731,260 | B2 | * | 6/2010 | Heller ................ B62D 33/0273 296/50 |
| 9,676,339 | B2 | * | 6/2017 | Huebner ................ B60R 5/045 |
| 9,944,333 | B1 | * | 4/2018 | Stojkovic ................ B60R 5/006 |
| 9,956,996 | B2 | * | 5/2018 | Astrike ................ B62D 33/03 |
| 2006/0152029 | A1 | * | 7/2006 | Tomasson ................ B60J 5/105 296/51 |
| 2010/0140973 | A1 | * | 6/2010 | Duncan ................ B60J 7/20 296/100.09 |
| 2017/0066381 | A1 | * | 3/2017 | Disley ................ B60R 5/045 |

* cited by examiner

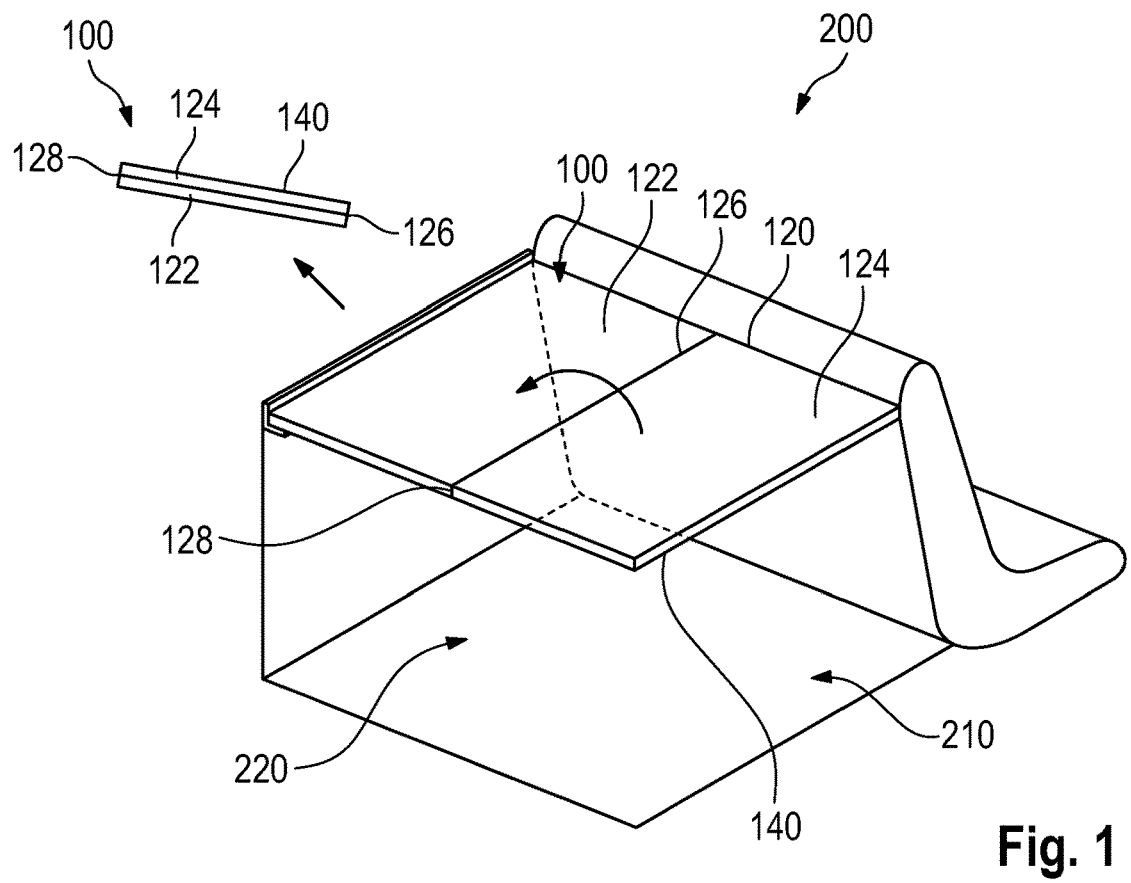
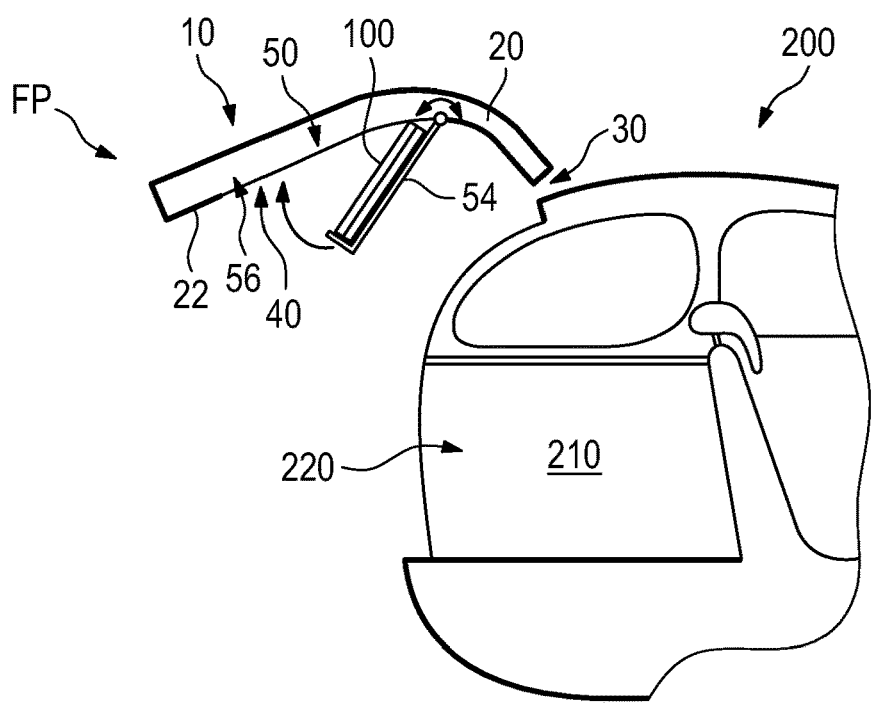

ACCESS FLAP FOR A LUGGAGE COMPARTMENT OF A VEHICLE

CROSS REFERENCE TO RELATED APPLICATIONS

This application claims benefit to German Patent Application No. DE 10 2017 115 278.4, filed Jul. 7, 2017, which is hereby incorporated by reference herein.

FIELD

The present invention relates to an access flap for a luggage compartment of a vehicle, to a covering device for covering a luggage compartment, and to a covering system for the luggage compartment of a vehicle.

BACKGROUND

It is known that vehicles are equipped with what are referred to as tailgates which serve as an access flap to a luggage compartment of the vehicle. This may firstly involve a simple trunk lid, but secondly also a complete rear portion of the vehicle, which rear portion folds upward together with the rear window of the vehicle. In particular in the case of what are referred to as station wagons or SUVs, a relatively large luggage compartment is frequently provided, with a large access opening to said luggage compartment. In order to reach the luggage compartment, the access flap in the form of the tailgate has to be opened, i.e. moved into an opening-up position. Said access opening is closed in the closure position. Customarily, the luggage compartments in the interior of the vehicle are additionally protected against inspection through the windows of the vehicle, on the one hand, and against objects flying out of the luggage compartment into the passenger compartment of the vehicle, on the other hand. Use is made for this purpose of covering devices which are also known as covering surfaces or rear parcel shelves. Said covering devices can be removed in order to increase the volume of the luggage compartment for large and bulky objects.

It is disadvantageous in the case of the known solutions that the covering devices which are used are relatively voluminous and bulky. Solutions which provide said covering devices in the manner of roller blinds are basically known. However, the latter have the disadvantage of having no stability whatsoever on the upper side. In the case of fixed covering devices, the disadvantage is that the latter are relatively bulky and are therefore annoying when removed from the luggage compartment in order to create a larger luggage compartment volume. If the covering device is removed in a garage at the home of the vehicle owner, the covering device can be stored in the garage. If, however, a situation outside the garage, for example in an external car park, requires the luggage compartment volume to be increased, the stiff covering device has to be awkwardly stored within the vehicle or within the luggage compartment. This leads to increased complexity and to an additional wasting of stowage volume in the luggage compartment which is otherwise increased in this manner.

SUMMARY

In an embodiment, the present invention provides an access flap for a luggage compartment of a vehicle. The access flap includes a basic body configured to close an access opening to the luggage compartment of the vehicle in a closure position and to open up the access opening in an opening up position, and a bearing device configured to mount the basic body for a reversible movement between the closure position and the opening up position. The basic body has a fastening portion for the fastening of a covering device for covering the luggage compartment in the interior of the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a covering device according to an embodiment of the invention;

FIG. 2 shows the covering device of FIG. 1 in a stowage position of a first access flap;

DETAILED DESCRIPTION

Figure 3:
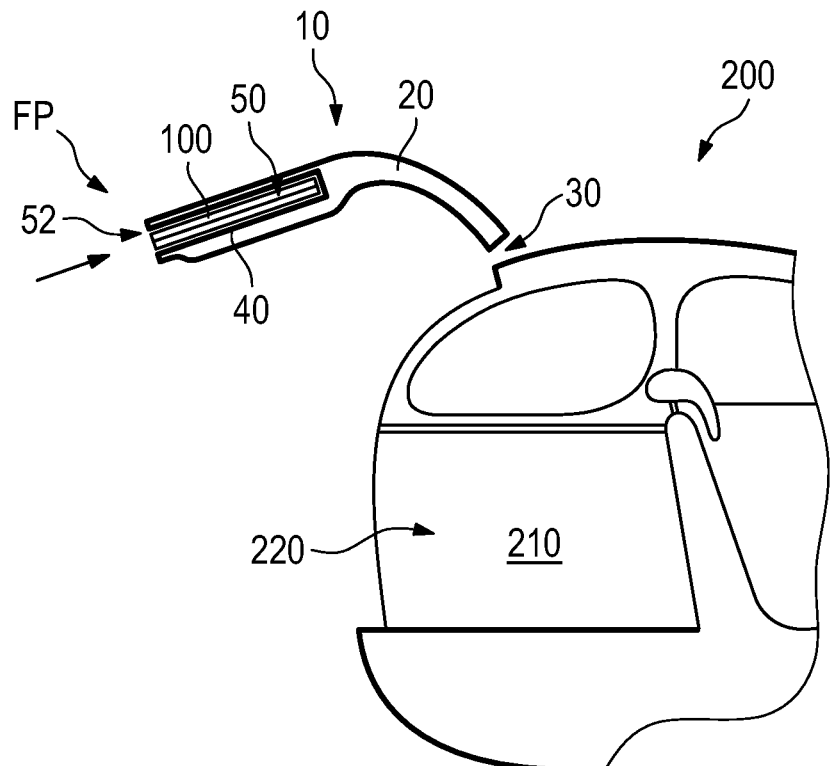
FIG. 3 shows an access flap according to a further embodiment of the invention.

Embodiments of the present invention address the disadvantages described in the background section above. In particular, embodiments of the present invention increase the flexibility of stowing a covering According to embodiments of the invention, access flaps for a luggage compartment of a vehicle are provided. Said access flaps have a basic body for closing an access opening to the luggage compartment of the vehicle in a closure position. In order to open up the access opening, the basic body can be moved into an opening-up position. For this movability, a bearing device for the mounting of the basic body for a reversible movement between the closure position and the opening-up position is provided. For this purpose, the basic body has a fastening portion for the fastening of a covering device for covering the luggage compartment in the interior of the vehicle.

According to embodiments of the invention, different positions and different uses can now be differentiated from one another. Firstly, a use position and a stowage position for the covering device can be differentiated. In the use position, the covering device is located in a position above the luggage compartment within the vehicle and, in said use position, separates the luggage compartment from the interior of the vehicle. In other words, the covering device, for example in the form of a rear parcel shelf, is in a latched position and thereby protects against the described inspection of the luggage compartment or against objects flying out of the luggage compartment into the passenger compartment of the vehicle.

If an increase of the luggage compartment or a larger stowage volume is desired, the covering device can be removed in a reversible manner from said use position and fastened in a stowage position to the fastening portion of the access flap. For this purpose, it is, of course, possible that, as is also explained further on, a folding up or collapsing will reduce the geometrical extent of the covering device. Owing to the fact that the access flap explicitly and specifically has a fastening portion for fastening a covering device in such a fastening position or stowage position, it is also possible, independently of storage positions outside the vehicle, for fastening and therefore stowing of the covering device within the vehicle to be ensured in the region of the access flap. Owing to the fact that a defined position including a fastening functionality is provided for the covering device on the access flap, transport of the covering device is simplified and at the same time there is defined storage. Whereas, in the known solutions, the covering device would have to be awkwardly stowed within the luggage compartment or would even have to be moved into the passenger compartment of the vehicle, it is possible according to embodiments of the invention for the fastening and the stowage to take place in the region of the fastening portion of the access flap in a simplified and easily usable manner.

The fastening portion can be designed in a reversible manner such that, of course, said fastening can be undone again in order, following use of the large stowage volume, to reduce the size of the luggage compartment again and to move the covering device again into the use position.

It is furthermore of advantage if the covering device in the defined position on the fastening portion requires as little stowage space as possible or preferably no stowage space within the luggage compartment. Use is made for this purpose in particular of the receiving volume which is also explained further on, in order to be able to ensure that the covering device is received in or on the access flap in a substantially closed, in particularly completely closed manner.

By way of the correlation of the access flap with the fastening portion, a comfortable and especially compact solution is therefore now provided in order to be able to stow the covering device within the access flap not only in the use position but also in a stowage position in or on the vehicle. The space in the luggage compartment that is intended to be increased by removal of the covering device remains substantially unaffected by the fastening of the covering device and can therefore be entirely or substantially entirely used as increased stowage space.

An advantage can be obtained if, in the case of an access flap according to an embodiment of the invention, the fastening portion is arranged in a receiving volume of the basic body for receiving the covering device. Such a fastening portion in a receiving volume permits the covering device to be able to be received in particular completely or partially completely in said receiving volume. This therefore means that the geometrical extent of the covering device finds space within the receiving volume and therefore the outer contours of the access flap are not exceeded when the covering device has been fastened to the fastening portion. This has the effect that an impediment of the possible stowage volume in the luggage compartment is substantially completely prevented even after the covering device is fastened to the fastening portion. The flexibility in the usability of the luggage compartment is therefore increased even further for such an access flap. An effect on the volume of the luggage compartment is reduced in a corresponding manner by the provision of such a receiving volume. The receiving volume can be provided here with or without a cover, and therefore additional protection or additional securing is possible with the aid of the fastening portion in the region of the receiving volume.

Furthermore, it is of advantage if, in the case of an access flap according to an embodiment of the invention, the receiving volume has a receiving slot for pushing the covering device into the receiving volume. Such a receiving slot serves explicitly for using the small cross-sectional extent of such a covering device in order to be able to ensure that the covering device is pushed laterally or in a transversely directed manner into the receiving volume. A further reduction in the overall space required for the access flap and in particular for the receiving volume is therefore possible. It is particularly preferred here if a form-fitting connection is at least partially entered into between the receiving volume and the pushed-in covering device, and therefore a form-fitting fastening functionality is thereby at least partially already provided by the receiving volume for the fastening portion. The receiving slot can be located here, for example, in the region of a closing portion of the access flap, and therefore, when the access flap is closed, the receiving slot of the receiving volume is not visible and is also not accessible. In this position, by pure geometrical ratios in the region of the securing portion, the closed access flap guards against the covering device falling out.

It is furthermore of advantage if, in the case of an access flap according to an embodiment of the invention, the receiving volume has a receiving cover for covering a receiving opening of the receiving volume. Such a receiving cover is in particular likewise configured with a hinge in order to be able to move said receiving cover to and fro between an open position and a closed position. If the covering device is now removed from the use position, said receiving cover can be opened in order to open up the receiving volume. The opened-up receiving volume can be used through the receiving opening in order to move the covering device into the fastening position or the stowage position. The fastening functionality itself can be provided separately here by fastening means. However, it is also conceivable for a fastening functionality for the covering device in the receiving volume to be ensured solely by the closing of the receiving cover and the corresponding form-fitting connection or force-fitting connection.

An access flap according to an embodiment of the invention can be developed to the effect that the fastening portion is arranged on an inner side of the basic body, said inner side being directed into the luggage compartment in the closure position. Such a fastening portion serves to provide said fastening functionality on the inner side of the basic body, i.e. within the interior of the vehicle. This in particular involves a combination with the receiving slot which has already been explained or the receiving opening which has already been explained. The arrangement on the inner side of the basic body, i.e. in the region of the interior of the vehicle, makes it possible to dispense with additional protection of the fastening portion or of a covering device arranged thereon since the latter is furthermore located in the protected portion in the interior of the vehicle even in the fastening position or the stowage position.

Furthermore, it is of advantage if, in the case of an access flap according to an embodiment of the invention, the geometrical extent of the fastening portion, in particular the geometrical extent of a receiving volume, is matched to an at least singularly folded geometrical extent of the covering device. By folding at least part of the covering device, the entire geometrical extent is reduced. In the case of a flat configuration of the covering device, an individual flat subsection can be folded onto another flat subsection such that the entire surface is provided with a smaller and therefore reduced width and a smaller and therefore reduced length. The associated fastening portion and in particular an associated receiving volume therefore only has to be adapted to a smaller geometrical extent, and therefore the structural flexibility for the arrangement of the receiving volume or of the fastening portion is increased.

Embodiments of the present invention also provide a covering device for covering a luggage compartment in the interior of a vehicle, with a covering body and a mating fastening portion for the fastening to the fastening portion of an access flap such as those described above. A covering device according to an embodiment of the invention therefore affords the same advantages as have been explained in detail with regard to an access flap.

Covering devices according to embodiments of the invention can be developed to the effect that the covering body has a first covering body portion and at least one second covering body portion, which covering body portions are connected foldably to each other, in particular via a hinge. Such a folding now makes it possible to change between a use extent and a stowage extent. In the use extent, the two covering body portions are folded apart from each other and the entire extent of the covering body is increased. In this embodiment, the covering body as the covering device can provide the desired separation for protection between the luggage compartment and the passenger compartment in the interior of the vehicle. An at least partial folding is undertaken for stowage on the fastening portion in the region of the access flap. In this case, a second covering body portion can be folded over, in particular flatly, onto a corresponding mating surface of the first covering body portion such that the entire geometrical circumferential extent of the covering body is reduced. If a hinge is used for this purpose, guided folding over therefore takes place, which simplifies said folding-over operation even further for the user. The already explained reduction in the outer geometry in respect of the extent leads to a smaller receiving volume or greater design freedom in the arrangement of the fastening portion on the access flap being possible.

Furthermore, it is of advantage if, in the case of a covering device according to an embodiment of the invention, the covering body has a fixing device for fixing the covering body portions in the unfolded and/or in the folded position. This means that an operating mode with greater comfort for the user is provided. The fixing can thus make it possible, in the folded and/or the unfolded state, to "freeze" said state and therefore to ensure easier handling or easier movement of the covering device in said state. This leads to great advantages in terms of comfort for the user in particular during the insertion into the receiving volume.

Embodiments of the present invention further provide covering systems for the luggage compartment of a vehicle. Such covering systems can have an access flap as described above and at least one covering device as also described above. The covering device can be fastenable to the fastening portion of the access flap by means of the mating fastening portion. By means of the use of such an access flap and of such a covering device, a covering system according to embodiments of the invention involves the same advantages as have been described in detail with regard to the access flap and in detail with regard to the covering device.

FIG. 1 schematically shows two positions of a covering device 100. Said covering device 100 can be seen at the bottom on the right in an unfolded state in the use position behind the backrest of the second seat row of a vehicle. In said use position, inspection of the luggage compartment 210 of the vehicle 200 is prevented by the covering device 100 in the unfolded position and therefore by the covering body 120. Items of luggage which are located in the luggage compartment 210 are obstructed by the covering device 100 from penetrating the passenger compartment of the vehicle because of corresponding centrifugal forces.

Figure 4:
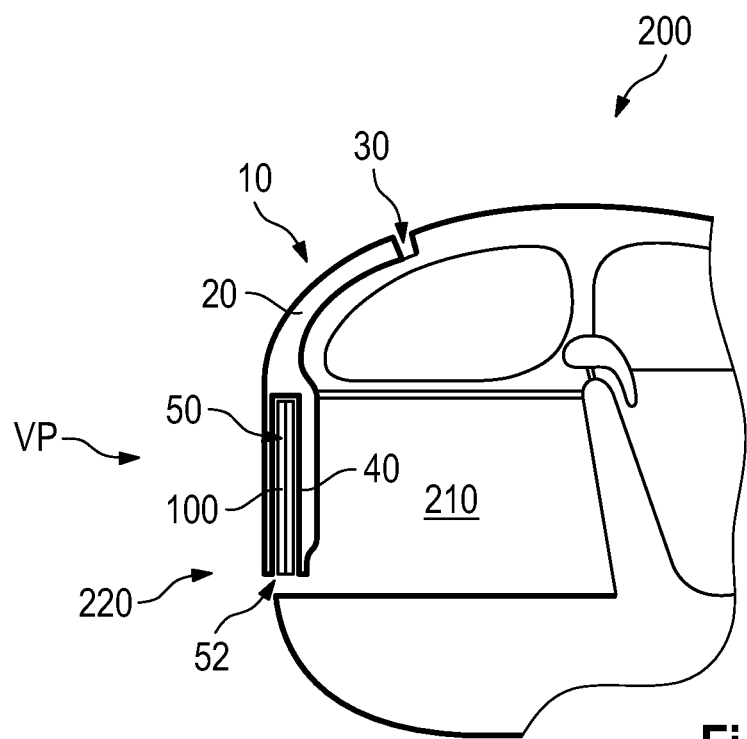
FIG. 4 shows the access of FIG. 3 with the access flap in the closure position.

For easier handling, the covering device 100 according to FIG. 4 is provided with two covering body portions 122 and 124. By the connection by means of a hinge 126, the second covering body portion 124 can now be folded along the arrow direction flat onto the first covering body portion 122. The cross section on the left at the top in FIG. 1 shows a result, wherein the entire covering device 100 or the covering body 120 is now illustrated laterally in the collapsed state via the hinge 126. Said folded state can now be fixed with the aid of a fixing device 128. The mating fastening portion 140 on the second covering body portion 124 is already illustrated schematically here on the outer side.

In the collapsed positon according to FIG. 1, the covering device 100 can be stowed or fastened on or in the access flap 10. FIG. 2 shows a first variant thereof. A receiving volume 50 is formed here in the access flap 10, which is located here in the opening-up position FP. A fastening portion 40 is located within the receiving volume 50. The covering device 100 has been inserted here into an associated receiving cover 54 which can be folded back into the receiving volume 50 with the aid of a hinge. A receiving opening 56 formed on the inner side 22 of the basic body 20 is closed in the process. In the closed position of the receiving cover 54, the covering device 100 is now located in a protected stowage position or fastening position. With the aid of the bearing device 30, the entire access flap 10 can be moved to and fro between the opening-up position FP and a corresponding closure position VP, wherein, in the closure position VP, the access with the aid of the access opening 220 to the luggage compartment 210 is closed.

FIGS. 3 and 4 schematically show another alternative for the access flap 10. This alternative is basically based on the embodiment according to FIG. 2. However, the fastening portion 40 is provided here with a different receiving volume 50. Access to said receiving volume 50 is undertaken via a receiving slot 52 which, in the closure position VP according to FIG. 4, correlates to a securing or closing portion of the access flap 10. In the closed state, the covering device 100 can therefore neither be removed nor can fall out of the receiving volume 50. In the open state of the opening-up position FP according to FIG. 3, the covering device 100 can be pushed in a particularly easily accessible manner through the receiving slot 52.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An access flap for a luggage compartment of a vehicle, the access flap comprising:
    a basic body configured to close an access opening to the luggage compartment of the vehicle in a closure position and to open up the access opening in an opening-up position; and
    a bearing device configured to mount the basic body for a reversible movement between the closure position and the opening-up position,
    wherein the basic body has a fastening portion of the access flap for fastening of a covering device for covering the luggage compartment in an interior of the vehicle, the covering device being separate and removable from the basic body, and
    wherein the basic body comprises a receiving volume configured to receive the covering device via a receiving slot, the receiving volume being defined by an enclosure configured to surround at least three sides of the covering device in a state where the covering device is received in the receiving volume,
    wherein the bearing device is coupled to the basic body at a top end of the basic body, and wherein the receiving slot is at a bottom end of the basic body, opposite the top end, and
    wherein, in the closure position, the basic body is configured such that the receiving slot is covered by a vehicle body part preventing access to the receiving slot and one side of the enclosure of the receiving volume facing the interior of the vehicle,
    wherein the covering device is removable from the receiving volume only by translating the covering device out of the basic body when the basic body is pivoted away from the vehicle to open the access opening.

2. The access flap as claimed in claim 1, wherein the fastening portion is arranged in the receiving volume of the basic body.

3. The access flap as claimed in claim 1, wherein a geometrical extent of the fastening portion is matched to an at least singularly folded geometrical extent of the covering device.

4. A covering device for covering a luggage compartment in an interior of a vehicle, the covering device comprising:
    a covering body; and
    a mating fastening portion configured to be fastened to a fastening portion of an access flap, the access flap comprising:
        a basic body configured to close an access opening to the luggage compartment of the vehicle in a closure position and to open up the access opening in an opening-up position, the basic body comprising a receiving volume configured to receive the covering device via a receiving slot, the receiving volume being defined by an enclosure configured to surround at least three sides of the covering device in a state where the covering device is received in the receiving volume, and
        a bearing device configured to mount the basic body for a reversible movement between the closure position and the opening-up position,
    wherein the basic body of the access flap has the fastening portion of the access flap for fastening of the covering device for covering the luggage compartment in the interior of the vehicle,
    wherein the covering device is separate and removable from the basic body, and
    wherein the bearing device is coupled to the basic body at a top end of the basic body, and wherein the receiving slot is at a bottom end of the basic body, opposite the top end, and
    wherein, in the closure position, the basic body is configured such that the receiving slot is covered by a vehicle body part preventing access to the receiving slot and one side of the enclosure of the receiving volume facing the interior of the vehicle,
    wherein the covering device is removable from the receiving volume only by translating the covering device out of the basic body when the basic body is pivoted away from the vehicle to open the access opening.

5. The covering device as claimed in claim 4, wherein the covering body has a first covering body portion and at least one second covering body portion, wherein the first covering body portion and the second covering body portion are foldably connected to each other.

6. The covering device as claimed in claim 5, wherein the covering body has a fixing device configured to fix the covering body portions in an unfolded and/or in a folded position.

7. A covering system for a luggage compartment in an interior of a vehicle, the covering system comprising:
    an access flap having:
        a basic body configured to close an access opening to the luggage compartment of the vehicle in a closure position and to open up the access opening in an opening-up position, and
        a bearing device configured to mount the basic body for a reversible movement between the closure position and the opening-up position; and
    a covering device having:
        a covering body, and
        a mating fastening portion configured to be fastened to a fastening portion of an access flap,
    wherein the basic body of the access flap has the fastening portion of the access flap for fastening of the covering device for covering the luggage compartment in the interior of the vehicle,
    wherein the basic body comprises a receiving volume configured to receive the covering device via a receiving slot, the receiving volume being defined by an enclosure configured to surround at least three sides of the covering device in a state where the covering device is received in the receiving volume,
    wherein the covering device is separate and removable from the basic body,
    wherein the bearing device is coupled to the basic body at a top end of the basic body, and wherein the receiving slot is at a bottom end of the basic body, opposite the top end, and
    wherein, in the closure position, the basic body is configured such that the receiving slot is covered by a vehicle body part preventing access to the receiving slot and one side of the enclosure of the receiving volume facing the interior of the vehicle,
    wherein the covering device is removable from the receiving volume only by translating the covering device out of the basic body when the basic body is pivoted away from the vehicle to open the access opening.

8. The covering system according to claim 7, wherein the mating fastening portion is configured to be fastened to the fastening portion of the access flap via a form-fitting connection.

9. The covering system according to claim 7, wherein the receiving volume is dimensioned such that it can completely receive the covering device.

10. The covering system according to claim 7, wherein the enclosure is configured to surround four sides of the covering device in the state where the covering device is received in the receiving volume.

11. The access flap as claimed in claim 1, wherein the covering device has, in an unfolded configuration, an unfolded length and an unfolded width that each correspond to a length and a width of the luggage compartment such that the covering device, in the unfolded configuration, covers the luggage compartment; and wherein the receiving volume has a geometric extent that comprises at least a length, a width, and a height that correspond to a length, a width, and a height of the covering device in a stowage configuration such that the geometric extent of the receiving volume at least fully encompasses the entirety of the covering device in a stowage position when inserted into the receiving volume.

12. The covering device according to claim 4, wherein the covering device, in an unfolded configuration, an unfolded length and an unfolded width that each correspond to a length and a width of the luggage compartment such that the covering device, in the unfolded configuration, covers the luggage compartment; and wherein the receiving volume has a geometric extent that comprises at least a length, a width, and a height that correspond to a length, a width, and a height of the covering device in a stowage configuration such that the geometric extent of the receiving volume at least fully encompasses the entirety of the covering device in its stowage configuration when inserted into the receiving volume.

13. The covering system according to claim 7, wherein the covering device has, in an unfolded configuration, an unfolded length and an unfolded width that each correspond to a length and width of the luggage compartment such that the covering device, in the unfolded configuration, covers the luggage compartment; and wherein the receiving volume has a geometric extent that comprises at least a length, a width, and a height that correspond to a length, a width, and a height of the covering device in a stowage configuration such that the geometric extent of the receiving volume at least fully encompasses the entirety of the covering device in its stowage configuration when inserted into the receiving volume.

14. The covering system according to claim 13, wherein the covering device comprises two covering body portions connected by a hinge, wherein, in the stowage configuration, the two covering body portions are folded together by the hinge.

15. The covering system according to claim 13, wherein the covering device is configured to be selectively fixable between the unfolded configuration and the stowage configuration.

16. The covering system according to claim 13, wherein the geometrical extent of the receiving volume corresponds to a singularly folded geometrical extent of the covering device.

17. The covering system according to claim 13, wherein in the stowage configuration, the covering device is form-fittingly fastenable within the receiving volume.

* * * * *